April 12, 1960 G. W. KENYON 2,932,416
CAR TOWING AND PUSHING ATTACHMENT
Filed Feb. 4, 1957 4 Sheets-Sheet 1

INVENTOR.
GEORGE W. KENYON
BY
ATTORNEY

April 12, 1960

G. W. KENYON 2,932,416

CAR TOWING AND PUSHING ATTACHMENT

Filed Feb. 4, 1957

INVENTOR.
GEORGE W. KENYON

BY

ATTORNEY

April 12, 1960

G. W. KENYON 2,932,416

CAR TOWING AND PUSHING ATTACHMENT

Filed Feb. 4, 1957

INVENTOR.
GEORGE W. KENYON

BY

ATTORNEY

April 12, 1960 G. W. KENYON 2,932,416
CAR TOWING AND PUSHING ATTACHMENT
Filed Feb. 4, 1957 4 Sheets-Sheet 4
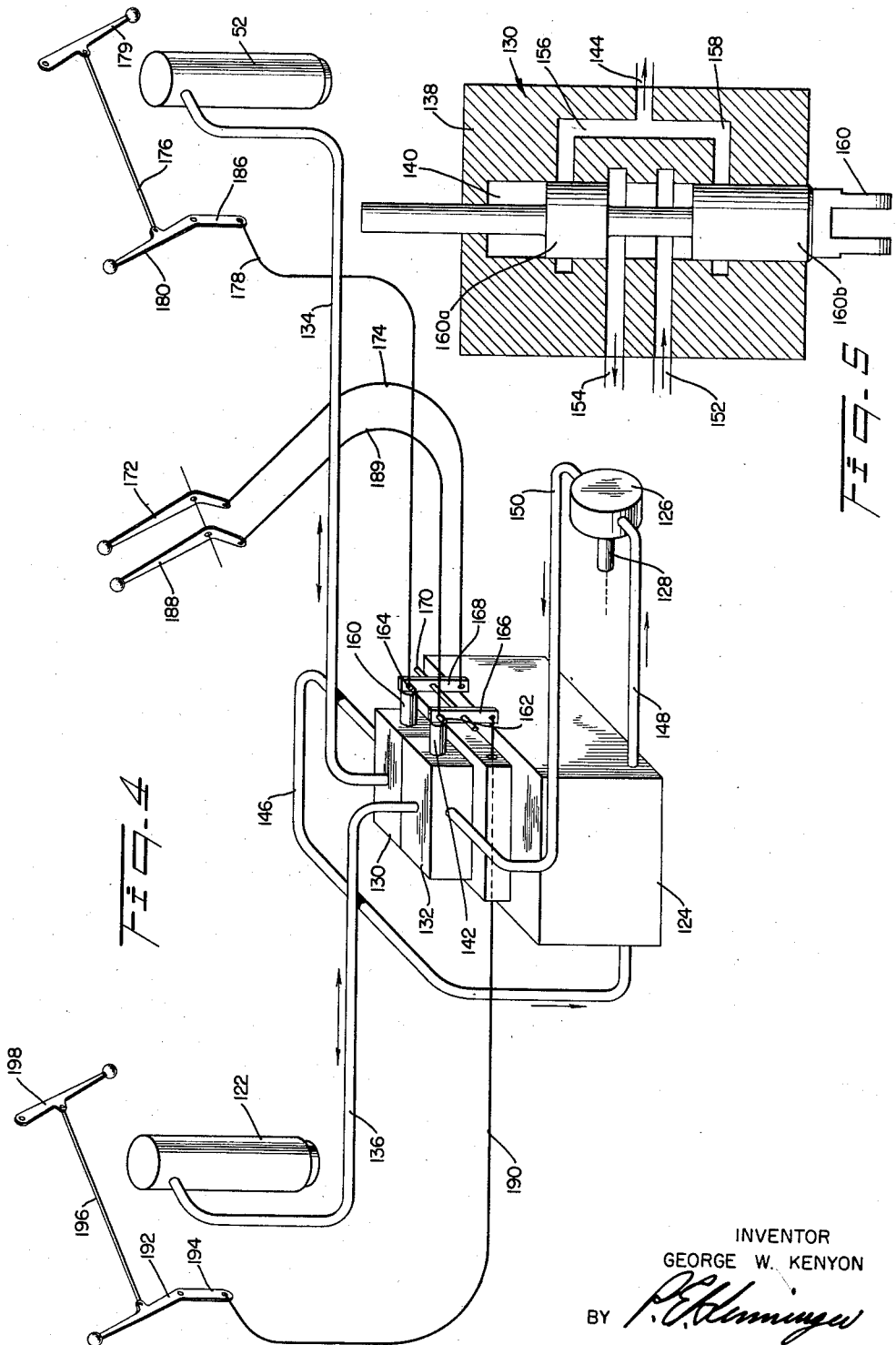
INVENTOR
GEORGE W. KENYON
BY
ATTORNEY

United States Patent Office

2,932,416
Patented Apr. 12, 1960

2,932,416

CAR TOWING AND PUSHING ATTACHMENT

George W. Kenyon, Clayton, N.Y., assignor to Frink Sno-Plows, Inc., Clayton, N.Y., a corporation of New York Application February 4, 1957, Serial No. 637,998

6 Claims. (Cl. 214—86)

This invention relates to a vehicle for towing or pushing disabled motor cars. More particularly, the invention relates to power operated attachments for transport vehicles such as motor trucks by means of which one end of a disabled motor car may be lifted to raise it into towing or pushing position.

It is an object of this invention to provide power operated car lifting mechanism of the class described which is easily controlled from a plurality of points commonly occupied by an operator while securing or releasing a disabled car.

It is a further object of the invention to provide power operated car lifting mechanism at the front and rear of a transport vehicle which embodies an integrated control system, but in which the lifting mechanism at opposite ends of the vehicle may be controlled selectively and independently from a plurality of locations.

It is still a further object of the invention to provide an integrated hydraulic control system by which a pair of motor car lifting rams may be controlled selectively from a plurality of locations.

It is still a further object of the invention to provide motor car lifting mechanism in conjunction with a bumper plate such that the cooperative parts of the lifting mechanism tend to maintain operative contact with the bumper plate.

It is still a further object of the invention to provide a motor car lifting mechanism having car lifting hooks for engaging a bumper of a disabled motor car which are mounted for rolling contact along a vertical path on the face of an associated bumper plate.

In its specific form, the invention comprises a pair of bumper plates attached respectively to the front and rear of a transport vehicle such as a motor truck. Each bumper plate has associated therewith a pair of cable suspended bumper engaging hooks which are provided with rollers adapted to operate in contact with their associated bumper plate as they are raised and lowered while lifting and lowering an end of a disabled car. An hydraulic ram is associated with the lifting cables at each end of the vehicle and an integrated hydraulic operating and controlling system is provided for the rams such that the rams may be independently and selectively operated either from within the cab of the motor vehicle or externally from either side of the vehicle.

Other advantages and objects of the invention will be pointed out herein and others will be apparent from a reading of the sub-joined specification in light of the drawings, in which:

Fig. 4 is a more or less diagrammatic view of the integrated hydraulic system and the controls therefor; and Fig. 5 is a sectional view, parts being shown in full-line, of a valve mechanism suitable for use in the hydraulic control system.

Figure 1:
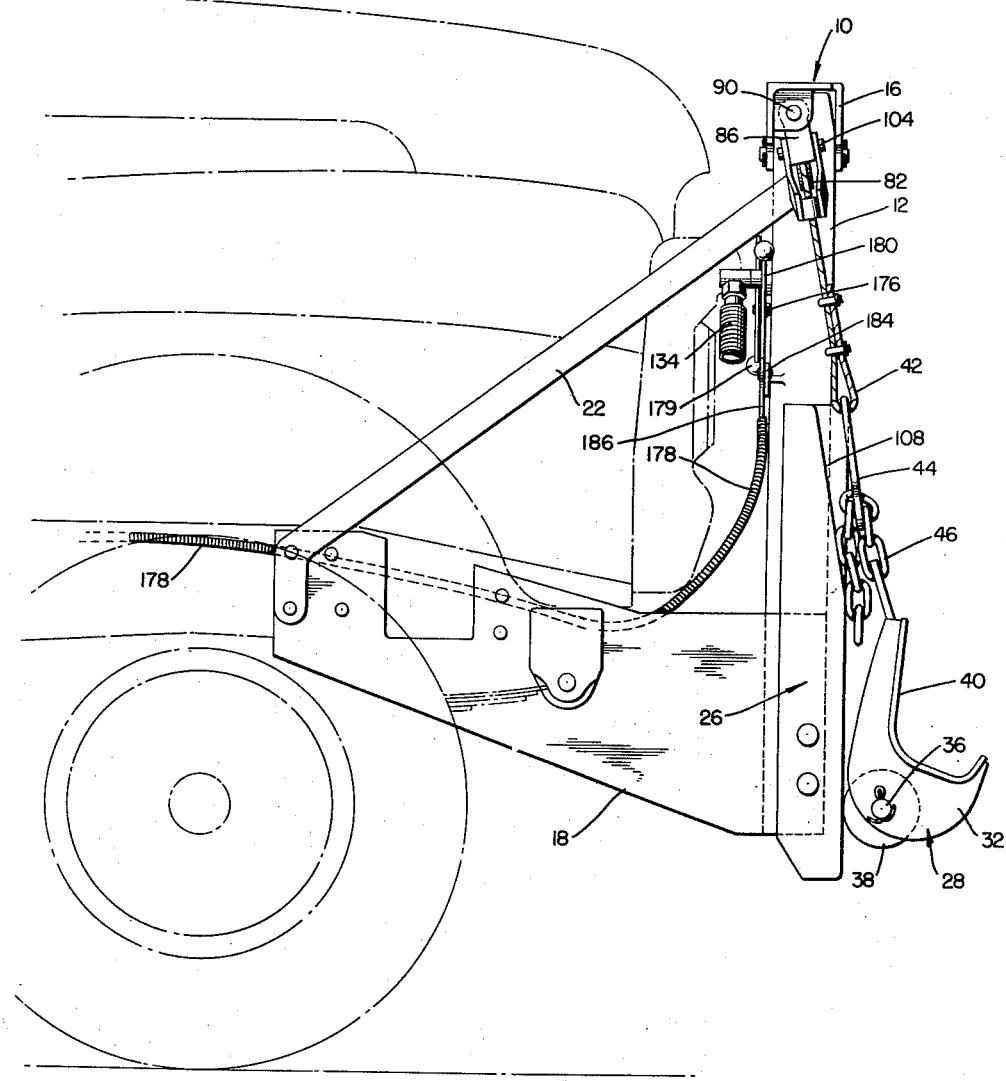
Fig. 1 is a side elevational view of lift mechanism, in the form of an attachment to the front end of a vehicle, for raising and lowering an end of a disabled motor car that is to be pushed.

Figure 1 represents the front end of a transport vehicle such as a motor truck to which the lift mechanism and bumper plate of the invention herein is attached. It is contemplated that the lift mechanism and an associated bumper plate will be installed at both the front and rear of a transport vehicle, and to the end that lift mechanism at the front and rear of such vehicle may be controlled selectively, an hydraulic system as in Fig. 4 has been provided for the control of a pair of remotely located mechanisms. The lift mechanism and associated bumper plate located at either ends of a transport vehicle will be substantially identical; therefore, a detailed consideration of the mechanism at one end of the transport vehicle will provide an understanding of both such mechanisms.

Figure 2:
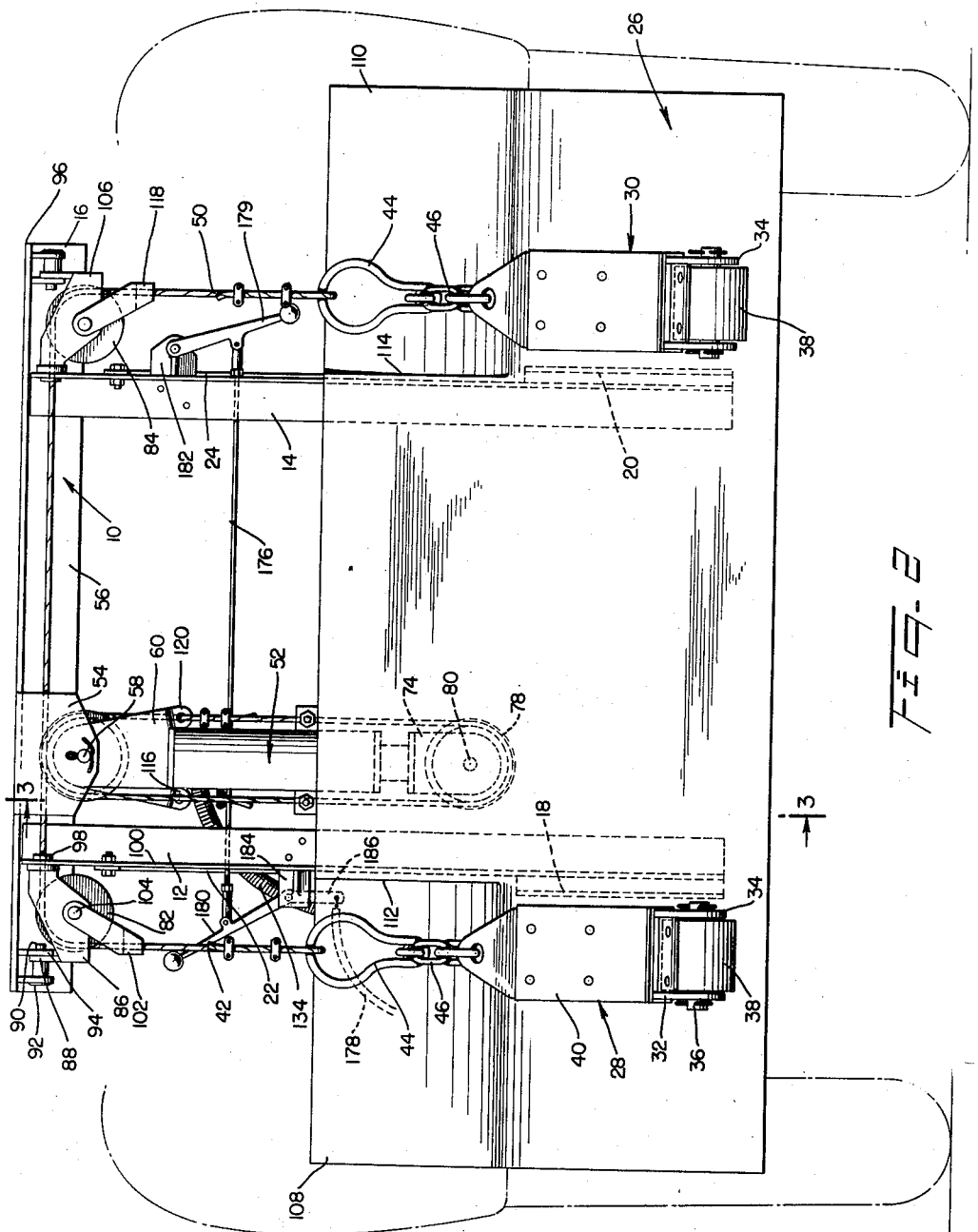
Fig. 2 is a front elevational view of the mechanism shown in Fig. 1.

In Fig. 2, a lift frame 10 consisting of a pair of upright angle bars 12 and 14 and a connecting horizontal angle bar 16 is attached to the frame of a transport vehicle such as a motor truck by means of a pair of side plates 18 and 20 interconnecting the lower ends of the upright angle bars 12 and 14, respectively, with the frame of the motor truck. A pair of lift frame side braces 22 and 24 interconnect the upper ends of the upright angle bars 12 and 14, respectively, with the frame of the motor truck.

Suitably attached to the lower portion of the lift frame is a bumper plate 26; this plate being approximately 6 feet long and 30 inches wide. The bumper plate 26 is rigidly attached to the lift frame such that the lower edge of the bumper plate is approximately 12 inches above an underlying road surface.

The bumper plate 26 has associated therewith a pair of identical lift hooks 28 and 30. The nature of these hooks can be explained by reference to the hook 28. These hooks are designed to engage under the bumper of a motor vehicle which is to be towed or pushed. The hook 28, by way of example, has a pair of flanges 32 and 34 between which extends a pin 36 providing an axle for a roller 38. The roller 38 is of such diameter that it extends rearwardly of the hook and into contact with the face of the bumper plate 26. The hooks are of such width, and preferably faced with a padding material 40, that adequate support for a bumper is provided and that scratching or scuffing of the bumper is avoided.

The hook 28 is suspended from a flexible cable 42 to the end of which is attached a chain-grab link 44 adapted to securely engage a short length of a chain 46 attached to the upper end of the hook. The hook 30 is similarly suspended from a flexible cable 50. The cables 42 and 50 may be ⅜" wire rope, for example.

Figure 3:
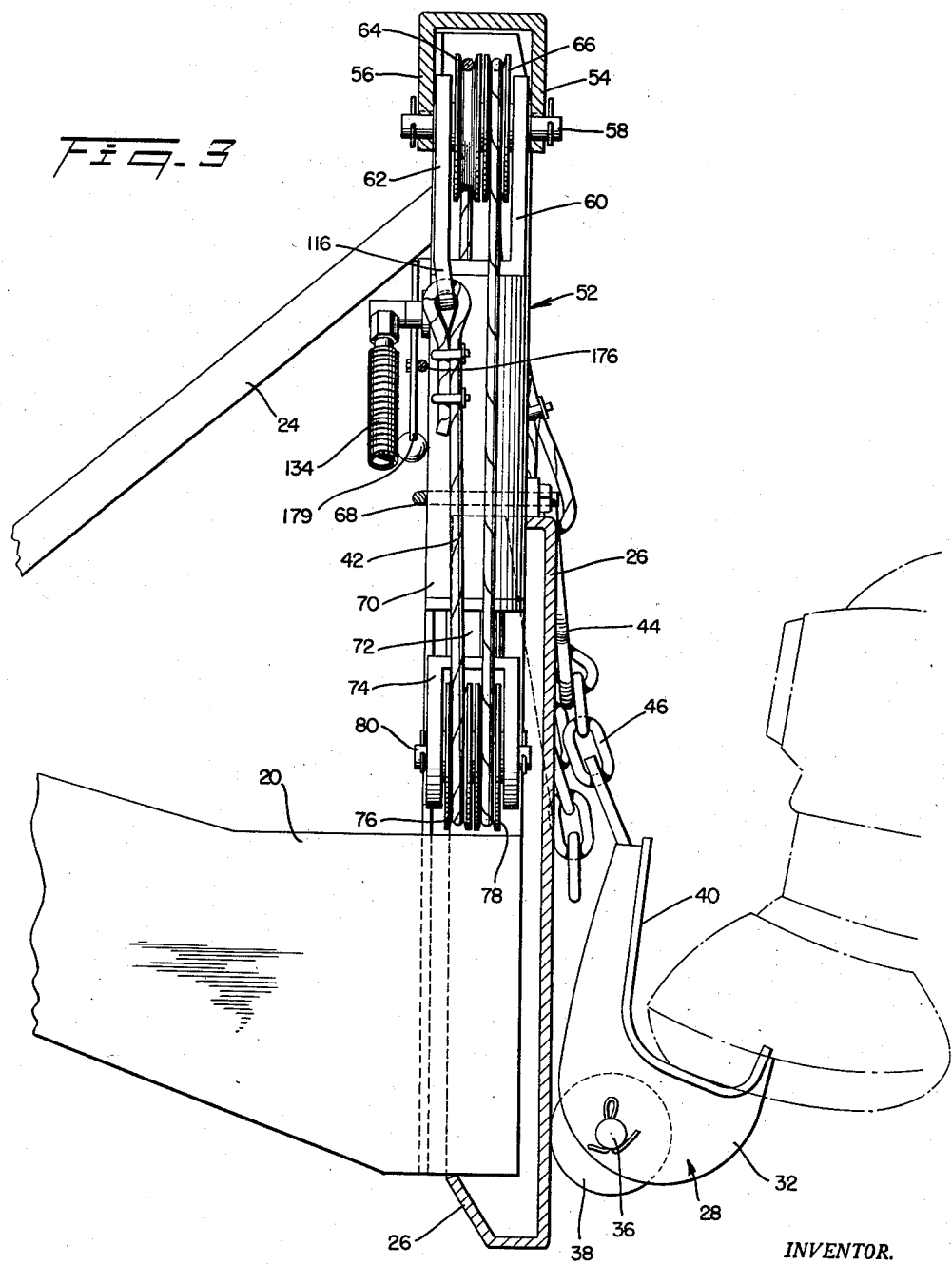
Fig. 3 is a vertical sectional view on line 3—3 of Fig. 2.

The cables 42 and 50 are reaved about a pair of cable sheaves located at opposite ends of an hydraulic ram 52. The hydraulic ram is suspended from the lift frame angle bar 16. The angle bar 16 has a flange 54 welded thereto which, together with the flange 56 of the angle bar 16 constitutes mounting means for the ram 52. As best seen in Fig. 3, the flanges 54 and 56 support a pin 58 which passes through a pair of spaced ears 60 and 62 constituting a bifurcated ram yoke extending upwardly from the ram 52. The ears 60 and 62 are spaced from each other to accommodate a pair of cable sheaves 64 and 66. The lower end of the ram 52 is fixed to the bumper plate 26 by means of a U-bolt 68, thus stabilizing the ram in a vertical position.

The ram 52 comprises a cylinder 70 and a piston 72, which is adapted to reciprocate in the cylinder 70. The outer end of the piston 72 is in the form of a bifurcated yoke 74 between the spaced side walls in which are housed a second pair of cable sheaves 76 and 78. The sheaves 76 and 78 are mounted for rotation on a pin 80 extending between the side walls of the yoke 74.

The cables 42 and 50 extend about sheaves 82 and 84, respectively. The sheave 82 is mounted for rotation in a sheave frame 86 which is pivoted on the lift frame for rocking movement in the forward and rearward direction on a transverse axis. To this end, the sheave frame 86 has an apertured upstanding lug 88 adapted to receive a pivot pin 90. The pivot pin 90 is supported in a pair of ears 92 and 94 extending downwardly from a horizontal flange 96 of the angle bar 16. At the opposite side of the sheave frame 86 is a boss 98 adapted to extend into an accommodating aperture formed in a flange 100 of the upright angle bars 12, 14. The cable 42 passes through a swinging fair leader 102 which is pivoted on a sheave axis 104.

The sheave 84 at the opposite side of the lift frame is mounted for rotation in a sheave frame 106 supported from the lift frame in the same manner as the frame 86.

By reference to Fig. 1 of the drawings, it will be seen that the transverse axis of the sheave frame 86, represented by the pivot pin 90, is located rearwardly of the face plane of the pumper plate 26. The sheave frame 106 is similarly located. By reason of the displacement of the sheaves 82 and 84 to the rear of the bumper plate face, the cables 42 and 50 are disposed at an outward inclination such that their attached lift hooks 28 and 30, respectively, are normally urged by gravity into contact with the face of the bumper plate 26.

By reference to Figs. 1 and 2, it will be seen that areas of the bumper plate face in the region of the upper corners of the plate are offset in a rearward direction to present rearwardly inclined faces 108 and 110. These offset faces present vertical abutments 112 and 114 which tend to limit transverse swaying of the lift hooks 28 and 30.

The cable 42 is passed through the eye of the fair leader 102, about the guide sheave 82, about the upper ram sheave 64, about the lower ram sheave 76, and the end thereof is attached to an eye 116 formed in the plate 62 of the upper ram yoke. The cable 50 is threaded through the eye of a fair leader 118, about the sheave 84, about the upper ram sheave 66, about the lower ram sheave 78, and the end thereof is anchored to an eye 120 formed in the plate 60 of the upper ram yoke.

As herein illustrated, the diameter of the ram 52 is 3 inches while its stroke is 14 inches. When the piston 72 is extended to its 14 inch limit, the cables 42 and 50 are consequently taken up 28 inches, which distance has been found suitable in actual practice.

The hydraulic system for operating rams at the front and back of a motor truck and the control instruments for the system are diagrammatically illustrated in Fig. 4, wherein the front ram 52 and a rear ram 122 are shown connected into an hydraulic system by which the rams can be operated selectively, either through the manipulation of internal control levers located within the cab of the transport vehicle or by means of external control levers located at the front and rear of the vehicle.

The hydraulic system includes a reservoir 124 for hydraulic fluid, a pump 126 having a power shaft 128 connected to the power plant of the transport vehicle, and a pair of single-acting valves 130 and 132. The front ram 52 is connected to the valve 130 by means of a conduit 134, while the rear ram 122 is connected to the valve 132 by means of a conduit 136.

The nature of the valves 130 and 132 is illustrated in Fig. 5 which may be presumed to be the valve 130 but which also discloses the nature of the valve 132 since valves 130 and 132 are identical. In Fig. 5, a valve body 138 has a chamber 140 therein in which is mounted a reciprocating plunger 160. The valve chamber 140 communicates with the reservoir 124 through a port 144 and an interconnecting conduit 146. The reservoir 124, in turn, is connected with the pump 126 by a conduit 148. Liquid discharged from the pump 126 by way of a conduit 150 enters the valve chamber 140 through a port 152 to which the conduit 150 is connected. Hydraulic fluid passes from the valve chamber 140 by way of a port 154 to which the conduit 134 is connected and through which hydraulic fluid passes to and from the ram 52.

The valve of Fig. 5 is shown in the position wherein hydraulic fluid from the pump 126 passes through the valve and to the ram 52. This results in operation of the ram 52, wherein the piston 72 is projected with the consequence that the cables 42 and 50 and their associated hooks 28 and 30 are raised. The valve port 144, which is connected to the reservoir 124, communicates with one end of the valve chamber through an internal port 156 and with the other end of the valve chamber through a second internal port 158. In the position illustrated in Fig. 5, the valve spool 160a effectively seals the port 156 and the valve spool 160b effectively seals the port 158. This establishes a path of flow from the pump 126 by way of the port 152, through the valve chamber 140, and from thence through the valve port 154 and the conduit 134 to the front ram 52.

A neutral or hold position of the ram is established by moving the valve stem outwardly so that the spool 160a closes the valve port 154. This effective traps the hydraulic fluid in the front ram 52. At the same time, the valve spool 160b uncovers the internal port 158 so that a flow path from the pump to the reservoir is now established via port 152, valve chamber 140, internal port 158, and outlet port 144.

Further retraction of the valve stem will bring the port 154 into communication with the internal port 156 such that a flow path for hydraulic fluid is established from the ram 52 via conduit 134, valve port 154, valve chamber 140, internal port 156, port 144, and conduit 146 to the reservoir 124.

A simple system for controlling the position of the valve stem 160, as well as an identical valve stem 142 of the valve 132 has been provided, as illustrated in Fig. 4 of the drawings. The control system includes a set of control levers which are located in the cab of the transport vehicle. Each of the internal control levers is connected to an associated valve by means of a flexible push-pull cable. It is also important that the valves can be controlled from the exterior of the transport vehicle. For this purpose, a control linkage has been provided at the front lift frame for controlling the front ram 52 while a similar control linkage has been provided at the rear lift frame for controlling the rear ram 122, both linkage systems being connected to their respective valve stems through flexible push-pull cables.

Specifically, reference to Fig. 4 will show that the valve stems 142 and 160 have a pivoted connection 162 and 164, respectively, with operating links 166 and 168, respectively. The operating links 166 and 168 are mounted on a pivot rod 170 at the midpoint of the links such that the pivot rod constitutes a fulcrum about which the links 166 and 168 can be rocked.

The front ram 52 can be operated by manipulating either a pivoted internal control lever 172 which is connected to the lower end of the link 168 by means of a flexible push-pull cable 174 or by reciprocating a front external control rod 176 such that a connecting push-pull cable 178 which is connected to the upper end of the link 168 effectively positions the valve stem 160 as may be desired to control the front ram 52. The front external control rod 176 extends to opposite sides of the front lift frame 10 where it is connected to a pair of levers 179 and 180. The levers 179 and 180 are pivoted respectively on a pair of ears 182 and 184 extending laterally from the upright angle bars 14 and 12, respectively. The front external control lever 180 has an extension 186 below the point at which it is pivoted to the ear 184 to which the flexible push-pull cable 178 is attached.

The valve 132 in control of the rear ram 122 is manipulated by a similar system of internal and external control levers. Specifically, a pivoted internal control lever 188 has attached thereto the flexible push-pull cable 189 such that movement of the internal control lever 188, acting through the push-pull cable 189, will reciprocate the valve stem 142 of the valve 132. The push-pull cable 189 has one end attached to the operating link 166 at the upper end thereof. The lower end of the operating link 166 has attached thereto a flexible push-pull cable 190 which extends rearwardly to the rear lift frame at which it is attached to a rear external control lever 192, the rear external control lever 192 being pivoted on the rear lift frame and having an extension 194 to which the flexible push-pull cable 190 is attached. An operating bar 196 interconnects the rear external control lever 192 with a second rear external control lever 198 which is pivoted to the rear lift frame at the side opposite the lever 192.

It will be seen that the front and rear external control levers provide a control for the hydraulic system from either side of the transport vehicle to which the mechanism is attached; thus providing a control point not only in the cab of the vehicle but also at either side of both the front and rear of the vehicle such that either ram may be controlled by the operator from the positions he normally occupies either while securing a disabled vehicle or releasing it.

Having thus described my invention, what I claim as new therein and desire to secure by Letters Patent is:

1. In a lift attachment for wheeled vehicles, a supporting frame adapted to be attached to one end of a vehicle, an elongated supporting plate attached to said frame such that a face thereof is disposed in a generally vertical plane, a pair of spaced sheaves supported for rotation by said frame at a point above said supporting plate, the supporting means for said sheaves being mounted for swinging movement on an axis parallel to the face of said supporting plate, a lift cable trained about each of said sheaves and depending downwardly therefrom to a point in front of said supporting plate, a lifting hook at the end of each of said cables, said hooks each having a supporting roller adapted to engage the face of said supporting plate, and an hydraulic ram cooperating with said cables for retracting the same whereby a load attached thereto is elevated to the face of said supporting plate.

2. In a lift attachment for wheeled vehicles, a supporting frame adapted to be attached to one end of a vehicle, an elongated supporting plate attached to said frame such that a face thereof is disposed in a generally vertical plane, a pair of spaced sheaves supported for rotation by said frame at a point above said supporting plate, the supporting means for said sheaves being mounted for swinging movement on an axis parallel to the face of said supporting plate, a lift cable trained about each of said sheaves and depending downwardly therefrom to a point in front of said supporting plate, a lifting hook at the end of each of said cables, said hooks each having a supporting roller adapted to engage the face of said supporting plate, and power means cooperating with said cables for retracting the same whereby a load attached thereto is elevated to the face of said supporting plate.

3. In a lift attachment for wheeled vehicles, a supporting frame adapted to be attached to one end of a vehicle, an elongated supporting plate carried by said frame such that a face thereof is disposed in a generally vertical plane, a pair of spaced sheaves supported for rotation by said frame at a point above the face of said supporting plate, a lift cable trained about each of said sheaves and depending downwardly therefrom to a point in front of the face of said supporting plate, a lifting hook freely suspended at the free end of each of said cables whereby said hooks are adapted for movement away from and into contact with the face of said supporting plate, said hooks each having a supporting roller adapted to engage the face of said supporting plate, and hydraulic power means cooperating with said cables for retracting the same whereby a load attached to said lifting hooks is elevated to the face of said supporting plate.

4. A lift for attachment to a wheeled vehicle comprising a supporting frame adapted to be attached to the vehicle, a plate attached to the frame and providing a surface disposed in a generally vertical plane, a pair of sheaves disposed in generally horizontally spaced relation to each other at points above said plate and for rotation of said sheaves on generally horizontal axes, a lift cable trained about said sheaves with its ends respectively depending downwardly from said sheaves at points in front of said plate, load engaging means respectively attached to said ends of said cables, means for supporting said sheaves on said frame so as to suspend said load engaging mean from points disposed above and rearwardly with respect to said plane of said surface of said plate for swinging movement of said load engaging means generally horizontally parallel to said surface of said plate and transversely of said surface of said plate and so as to bias said load engaging means into engagement with said surface of said plate, said surface of said plate being continuous in said plane for a substantial horizontal distance at either side of the respective verticals through said points of suspension of said load engaging means to provide for said horizontal swinging movement parallel to said plate surface in engagement with said surface, said surface having a substantial continuous vertical extent throughout said horizontal distances to provide for vertical movement of said load engaging means in engagement with said surface, each of said load engaging means carrying a member for engaging said surface of said plate upon a restricted contact area in bearing relation to said plate at any point to which said load engaging means is moved in the raising and lowering and swinging movements of said load engaging means, and power means cooperating with said cables for effecting movement of said load engaging means generally vertically upon said surface of said plate.

5. A lift for attachment to a wheeled vehicle as defined in claim 4 in which said power means is provided by an hydraulic ram cooperating with said cables for effecting said movement of said load engaging means generally vertically upon said surface of said plate.

6. A lift for attachment to a wheeled vehicle as defined in claim 4 in which said sheave supporting means is mounted on said frame for swinging movement of said sheaves on axes generally parallel to and offset rearwardly with respect to the plane of the surface of said plate to bias said load engaging means into engagement with said surface of said plate.

References Cited in the file of this patent

UNITED STATES PATENTS

| | | |
|---|---|---|
| 1,551,426 | Pavella | Aug. 25, 1925 |
| 1,835,431 | Ryerson | Dec. 8, 1931 |
| 2,008,324 | Grab | July 16, 1935 |
| 2,062,227 | Lambert | Nov. 24, 1936 |
| 2,264,569 | Holmes | Dec. 2, 1941 |
| 2,625,278 | Sensenbaugh | Jan. 13, 1953 |
| 2,632,627 | Schultz | Mar. 24, 1953 |
| 2,643,012 | Wahl | June 23, 1953 |
| 2,719,730 | Beck | Oct. 4, 1955 |
| 2,728,472 | Hacker | Dec. 27, 1955 |
| 2,770,324 | Peterson | Nov. 13, 1956 |